United States Patent [19]

Sulzbach

[11] 4,216,265
[45] Aug. 5, 1980

[54] AFTERTREATMENT OF THERMALLY PRETREATED TETRAFLUOROETHYLENE POLYMERS AND THE POLYMER POWDERS OBTAINED

[75] Inventor: Reinhard A. Sulzbach, Burghausen, Fed. Rep. of Germany

[73] Assignee: Hoechst Aktiengesellschaft, Fed. Rep. of Germany

[21] Appl. No.: 946,359

[22] Filed: Sep. 27, 1978

[30] Foreign Application Priority Data

Oct. 1, 1977 [DE] Fed. Rep. of Germany ....... 2744244

[51] Int. Cl.² ............................................... B32B 27/00
[52] U.S. Cl. ........................................ 428/402; 264/5; 264/121; 264/127
[58] Field of Search ................ 428/407, 402; 526/255, 526/247, 250; 264/121, 117, 127, 5, 9, 12

[56] References Cited

U.S. PATENT DOCUMENTS

| | | | |
|---|---|---|---|
| 2,989,777 | 6/1961 | Bailey, Jr. | 264/121 |
| 3,087,921 | 4/1963 | Mathews, Jr. et al. | 264/127 X |
| 3,152,201 | 10/1964 | Kumnick | 264/127 X |
| 3,331,825 | 7/1967 | Tominaga et al. | 526/255 |
| 3,419,522 | 12/1968 | Plimmer | 526/255 X |
| 3,527,857 | 9/1970 | Fitz | 526/255 X |
| 3,528,955 | 9/1970 | Lippman | 526/255 X |
| 3,532,782 | 10/1970 | Hartwimmer | 264/117 |
| 3,726,483 | 4/1973 | Kometani et al. | 526/255 X |
| 3,911,072 | 10/1975 | Saito et al. | 526/255 X |

*Primary Examiner*—Lorraine T. Kendell
*Attorney, Agent, or Firm*—Connolly and Hutz

[57] ABSTRACT

In a process for aftertreating thermally presintered polymers of tetrafluoroethylene the optionally comminuted powders are subjected, at temperatures below +80° C., to the action of a gas jet mill. Preferred starting materials are tetrafluoroethylene polymers containing a small proportion of a modifying monomer. By the aftertreatment the bulk density and the flow index of the powders are considerably improved without a noticeable disintegration taking place. The aftertreated powders are used in the first place for the manufacture of shaped articles in extrusion devices with automatic feeding means.

9 Claims, No Drawings

AFTERTREATMENT OF THERMALLY PRETREATED TETRAFLUOROETHYLENE POLYMERS AND THE POLYMER POWDERS OBTAINED

This invention relates to a process for aftertreating tetrafluoroethylene polymers which have been pretreated thermally by heating to 325° to 500° C. to a sintering degree of substantially 100%, determined by differential thermoanalysis, and which cannot be processed from the melt, optionally with mechanical comminution of the polymers prior to the aftertreatment, with improvement of the bulk density and the flow index of the granular tetrafluoroethylene polymer. The invention also relates to the polymer powders which have been aftertreated in this manner.

Owing to its high melt viscosity, polytetrafluoroethylene cannot be transformed into shaped articles by the processes known for thermoplasts. Therefore, it had been necessary to develop special processing techniques for polytetrafluoroethylene.

Ram extrusion is a continuous powder-sinter-process for the manufacture of endless pipes and bars. In this process a polytetrafluoroethylene powder is introduced in repeated cycles via an automatic dosing apparatus into a tube heated to sintering temperature, in the tube the powder is densified by a ram and transported forward by a corresponding length. Under these conditions, the powder coalesces to a uniform, extruded shaped article.

A polytetrafluoroethylene powder well suitable for ram extrusion should have a good flow behavior, i.e. a high bulk density and good flow index. Powders having poor flow properties give rise to difficulties in the automatic dosing and to a non uniform charge and densification in the sinter tube so that the sintered ram extrudate has an unsatisfactory quality. Moreover, the powder should have as high as possible a bulk density since the output of an apparatus per operating cycle increases with rising bulk density of the powder used.

To produce a powder suitable for ram extrusion a high molecular weight tetrafluoroethylene polymer is preferably used as starting material, which polymer has been prepared by suspension polymerization in an aqueous medium in the presence of a radical-forming initiator. Suspension polymers of tetrafluoroethylene obtained in this manner are suitable for ram extrusion under definite conditions only. Under high extrusion pressures, for example of 200 to 800 bars, as used in the manufacture of thin-walled pipes, they show the phenomenon of the so-called "poker chip formation", that is to say the sectional cuts of the individual charges become optically visible and at these point even cracks may form. On the other hand, suspension polymers of this type consist of absolutely non uniform particles and they have too low a bulk density, which is a drawback for automatic dosing.

It is, therefore, desirable to subject the tetrafluoroethylene polymers obtained by suspension polymerization to an additional aftertreatment in order to obtain powders for ram extrusion which satisfy all demands as regards processing properties and product quality.

U.S. Pat. No. 2,456,621 claims that polytetrafluoroethylene powders yield greatly improved ram extrudates when they have been subjected previously to a thermal treatment at temperatures of from 300° to 500° C. Such a thermal treatment for the production of a pre-sintered polytetrafluoroethylene powder and its subsequent mechanical comminution have also been proposed in U.S. Pat. No. 2,400,091. Still further, is has been proposed to produce mixtures of pre-sintered and non sintered polytetrafluoroethylene powder (U.S. Pat. No. 2,485,691) or partially sintered polytetrafluoroethylene powders (U.S. Pat. No. 3,558,583) and to use them for making shaped articles.

All these processes improve to a certain extent the quality of the ram extrudates made from the aftertreated powders, but the powders are still unsatisfactory in that they have poor flowing properties, a low bulk density and, hence, their dosing properties are unsatisfactory.

Attempts have also been made (Japanese Specification laid open No. 50/087,442) to subject a usual suspension polymer of tetrafluoroethylene first to a fine grinding and then to one of the usual agglomeration processes in liquid phase, to sinter and then to comminute the product obtained. But this process is rather expensive and complicate owing to the multistep procedure.

U.S. Pat. No. 3,152,201 describes a process for the manufacture of a polytetrafluoroethylene powder having improved flow properties and a higher bulk density, which comprises sintering a polytetrafluoroethylene powder at a temperature of from 327° to 400° C., cooling to room temperature the material baked together in the form of a cake, disintegrating the cake into small pieces and subjecting them to a further mechanical treatment at a temperature below +19° C. in a mixer until a particle size of from 200 to 500 μm is obtained. In this process it is absolutely necessary that during the mechanical aftertreatment the powder is maintained at a temperature below +19° C. This means that in industry the material must be cooled to a much lower temperature, since during the mechanical treatment heat is generated anyway. If the temperature increases to a value above +19° C., the properties of the powder obtained are detrimentally affected. Moreover, the risk exists that moisture penetrates into the powder by condensation during cooling. When copying this process, it has been found that the increase of the bulk density and the improvement of the flow index obtained in the aforesaid patent in a commercial mixer cannot be obtained in other apparatus for mechanical treatment and comminution, such as continuously operating mechanical grinding devices, for example a hammer mill. It has also been found that, besides cooling, a time of treatment of at least several minutes is required in a mixer to achieve a sufficient increase of the bulk density and to improve the flow index. Such a process step is little suitable for a continuous process. It is, therefore, still desirable to produce pre-sintered granular tetrafluoroethylene polymers having good flow properties, i.e. a high bulk density and an excellent flow index, by a simple and continuous process.

It is the object of the present invention to provide a process wherein the pre-sintered tetrafluoroethylene polymer is subjected at a temperature below +80° C. to the action of impact produced almost exclusively by interparticulate collision of the polymer particles under the accelerated influence of at least one gas jet of high velocity.

To carry out the process of the invention there can be used, in principle, jet mills of the most different constructions. In these devices the thermally pretreated polytetrafluoroethylene particles are distributed in at least one expanding gas jet of high velocity and projected against one another by the high velocity and turbulence of the gas jet.

Especially suitable devices to carry out the process of the invention are jet mills with spherical grinding zone into which the currents of the propellent (gas jet) are introduced tangentially through several nozzles arranged on the circumference so that they combine in the interior of the grinding zone to a circular stream whereby wear of the wall is avoided. Different types of such mills are described in U.S. Pat. No. 2,032,827. Commercial mills of this construction are, for example, the "Micronizer" and the "Aeroplex spiral jet mill", the latter manufactured by Messrs. Alpine.

Other suitable mills of this type are the "Reductionizer" (Industrial and Engineering Chemistry, 38, no. 7 (1946) page 676) or the Jet-O-Mizer (U.S. Pat. No. 2,590,220). The grinding zone of the latter type of jet mills consists of a vertical, thick and oviform tube into the lower bend of which the material to be ground is blown tangentially by means of a gas stream. Several gas jets are additionally blown in tangentially at a high speed whereby a strong circulating stream is produced in the tube. The finely ground material is removed by suction at the inner side of the top part of the tube.

Other jet mills can be used as well, for example a flowing bed jet mill (cf. DE-OS 2,040,519) i.e. an "Eagle Mill" in which the collision of the powder particles is produced by passing the powder through a long tube together with a gas of high speed (cf. Industrial and Engineering Chemistry 38, no. 7, page 677) or counterstream mills of various constructions in which two gas jets are directed against each other at an angle of impact of 180° (cf. Verfahrenstechnik 4, 1970, no. 8, page 356).

To produce such gas streams of high speed there can be used all gases that are inert towards the tetrafluoroethylene polymers to be treated, preferably compressed air, but for example nitrogen can also be used. The inlet pressure of the gas necessary for the production of the gas jet of high speed is not critical, it can be varied in the range of from 2 to 16 bars above atmospheric pressure, the inlet pressure preferably being in the range of from 3 to 8 bars above atmospheric.

The temperature at which the process of the invention is carried out can be chosen in a wide range of from −50° to +80° C. In contradistinction to the process disclosed in U.S. Pat. No. 3,152,201, no critical temperature conditions exist within this range. It is preferred to operate at room temperature so that any expenditure pertaining to energy or apparatus for cooling or heating can be dispensed with.

It has been found that tetrafluoroethylene polymers that have been thermally pretreated by heating at a temperature above the crystalline melting range of polytetrafluoroethylene of from 325° to 340° C. and that have a sintering degree of substantially 100%, determined by differential thermoanalysis, behave in the process of the invention completely different from polytetrafluoroethylene powder which has not been pretreated thermally. U.S. Pat. No. 3,528,955 and U.S. Pat. No. 3,640,984 propose processes wherein granular polytetrafluoroethylene powders, which have not been subjected to a thermal pretreatment, are treated in gas jet mills. In these mills the starting material is comminuted to an ultrafine powder having a mean particle size below 50 μm. Such fine powders, which are intended for press-sinter processing and for manufacture of sliced sheeting, have an extremely low powder density of about 300 to 400 g/l, they do not flow and are absolutely unsuitable for ram extrusion. With thermally pretreated powders a grinding to such fine particles does not occur, the average particle diameter diminishes at most slightly, while surprisingly the bulk density is distinctly increased by more than 150 g/l, in most cases by more than 200 g/l. Simultaneously, the flow index of the powder is noticeably improved.

In principle, all tetrafluoroethylene polymers having a melt viscosity of at least $1.10^9$ poises at 380° C. and which cannot be processed from the melt, i.e. which cannot be processed by the usual shaping processes for thermoplasts, which can be subjected to the aftertreatment according to the invention.

There are preferred suspension polymers of tetrafluoroethylene obtained in the form of granular powders with a wide particle size distribution of from about 300 to 3,000 μm and a very non uniform particle structure, as obtained by the usual suspension polymerization processes in the presence of radical forming initiators, and optionally also in the presence of precipitating agents or very small amounts of emulsifiers. Suspension polymers of this type have been described, for example, in U.S. Pat. Nos. 2,393,967; 2,394,243; 2,471,959; 2,510,783; 2,515,628; 2,520,338; 2,534,058; 2,565,573; 2,599,299; 3,632,847 and DE-OS 2,523,570.

After a water wash and a known thermal treatment the described crude polymers can be directly subjected to the aftertreatment according to the invention.

Especially preferred starting materials for the process of the invention are those suspension polymers of tetrafluoroethylene which have been prepared in the presence of small amounts (about 0.0004 to 1.5 mol %, calculated on monomeric tetrafluoroethylene) of a perfluorinated comonomer. Modified tetrafluoroethylene suspension polymers of this type are described, for example, in GB-PS 1,116,210, U.S. Pat. No. 3,331,822, U.S. Pat. No. 3,655,611, DE-OS 2,416,452, DE-OS 2,523,569 and DE-OS 2,617,829.

As modifying monomers for the suspension polymerization of tetrafluoroethylene there are particularly suitable (a) perfluoroalkylvinyl ethers of the formula

in which $R_f$ denotes a perfluoroalkyl radical having from 1 to 10, preferably 1 to 4 carbon atoms, especially the perfluoro-n-propyl radical;

(b) perfluorinated ethers of the formula

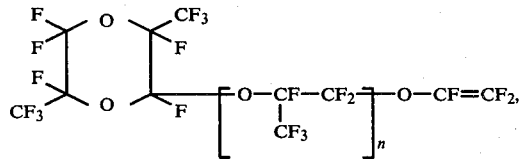

in which n is zero to 4, preferably zero or 1, especially zero;

(c) perfluorinated ethers of the formula

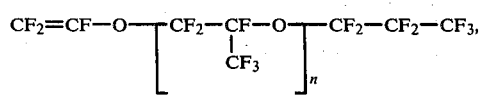

in which n is 1 to 4, preferably 1 or 2, especially 1;
(d) perfluoro-2-methylene-4-methyl-1,3-diioxolane, and
(e) perfluorinated olefins of the formula $$CF_2=CF-R_f$$

in which $R_f$ denotes a perfluoroalkyl radical having from 1 to 4 carbon atoms, especially hexafluoropropylene.

Especially good results are obtained with modifying monomers of groups (a), (b) and (c). Tetrafluoroethylene suspension polymers containing from 0.0002 to 0.5 mol % of said modifying monomer units calculated on tetrafluoroethylene units, and thermally pretreated in the indicated manner yield powders which have especially good properties for ram extrusion when aftertreated according to the invention.

It is, therefore, another object of the invention to provide a thermally pretreated tetrafluoroethylene polymer powder, which cannot be processed from the melt, which has been modified with from 0.0002 to 0.5 mol % of units of a perfluorinated monomer as specified above, calculated on tetrafluoroethylene units, which has a sintering degree of substantially 100%, determined by differential thermoanalysis, an average particle diameter $d_{50}$ of 200 to 900 μm, preferably 300 to 700 μm, a proportion of fine particles having a diameter below 150 μm of at most 15% by weight, determined by the dry sieve analysis, a bulk density of more than 770 g/l and a flow index of at most 3 seconds per 50 g.

The polymers preferably have a bulk density above 900 g/l up to 1,200 g/l and a flow index of from 1.3 to at most 2.6 seconds for 50 g.

As starting materials for the aftertreatment according to the invention there can also be used thermally pretreated tetrafluoroethylene polymer powders obtained from a primary suspension polymer by further treatment steps following polymerization and the washing process. Such further treatment steps, which are carried out in the first place to improve the powder properties of the crude polymer, are, for example, a grinding process in the wet state as described in U.S. Pat. No. 3,115,486 or the treatment of suspension polymers under the action of mechanical forces in liquid media (water, organic liquids or aqueous-organic media). Agglomeration processes of this type in a liquid medium are known from DE-PS 1,679,830, DE-PS 1,745,907, DE-PS 1,745,937, DE-PS 1,454,857, DE-AS 1,604,349 and DE-OS 1,544,624.

The thermally pretreated tetrafluoroethylene polymer powders used as starting materials in the process of the invention may also contain an inorganic filler, for example a metal powder, inorganic oxides or glass fibers. They can be obtained by one of the aforesaid wet agglomeration processes in the presence of the filler with subsequent thermal treatment.

The particle size of the thermally pretreated powder is substantially non critical for the aftertreatment according to the invention. The powders used have an average particle diameter ($d_{50}$) of about 200 to 1,500 μm, preferably 200 to 1,000 μm and especially 400 to 800 μm. The known thermal pretreatment of the tetrafluoroethylene polymer powder can be carried out at a temperature in the range of from 325° to 500° C. in a fluidized bed or in a stationary layer, in the latter case temperatures of from 340° to 420° C. being preferred. The duration of the thermal pretreatment depends, in the first place, on the temperatures chosen and with a stationary layer also on the layer thickness of the powder particles. The sintering time should be sufficiently long so that each individual powder particle is heated at least to the crystalline melting range of polytetrafluoroethylene of from 325° to 340° C.

When, for example, the thermal treatment is carried out at 350° to 380° C. with a stationary layer of polytetrafluoroethylene particles having a thickness of 1 to 3 cm, a completely presintered product is obtained after a sintering time of 0.5 to 4 hours.

In each case, the degree of sintering of the product to be used according to the invention should be substantially 100% (i.e. at least 97%) which can be controlled by differential thermoanalysis.

The aftertreatment of the invention makes it possible to produce powders having good flow properties and a high bulk density in commercial jet mills of simple construction. Cooling of the product is not necessary so that no precautions are required therefore. A further, still more important, advantage of the process of the invention is the extremely short treatment time of several seconds so that the process can be carried out continuously in simple manner. It is impossible to carry out such a continuous process under the conditions specified in the example of U.S. Pat. No. 3,152,201 in a discontinuously operating mixer. It has also been found that a continuously operating mechanical comminuting apparatus, for example a hammer mill, does not bring about a satisfactory improvement of the bulk density and the flow properties.

The following Table 1 demonstrates, on the one hand, that with the use of a discontinuously operating mixer, corresponding in principle to the "Waring Blendor" used in the example of U.S. Pat. No. 3,152,201, a prolonged treatment time is required to increase the bulk density and improve the flow index of the powder. For reaching a bulk density of over 700 g/l (comparative Examples A, B, C) a time treatment of several minutes is necessary.

On the other hand, Table 1 demonstrates that with a continuously operating mechanical hammer mill extremely unsatisfactory powder properties are obtained after a short treatment time (comparative Example D). The advantages of the process of the invention become evident when comparing the results of comparative Example D (continuous, mechanical method) with Example 1 according to the invention (continuous treatment in a jet mill).

Table 4 shows that powders having a much higher bulk density and improved flow index can be prepared from thermally pretreated polytetrafluoroethylene powders of the most different types (starting products E to M) (Examples 2 to 10).

The powder flow index is a criterion, suitable in practice, for the dosability of the powder in a processing apparatus. To determine the flow index 50 g of the powder to be tested are vibrated for one minute under specific conditions in a funnel and then the time is measured which is necessary for the powder to flow out of the funnel under vibration. It can be seen from Table 4 that this power property, which is important in processing, is improved in the products treated according to the invention by 10 to 50% as compared to the corresponding but untreated powders.

In Examples 2 to 4 thermally pretreated crude polymers are used which had been produced by suspension polymerization under different polymerization conditions (cf. Table 2). The starting products of Examples 7 to 8 are commercially available polytetrafluoroethylene powders (product J=Hostaflon ® TF 1100 of Messrs Hoechst AG, product K=Fluon ® G 201 of ICI LTD.), which are offered especially for ram extrusion. These commercial products are thermally pretreated polytetrafluoroethylene powders produced from suspension polymers.

Examples 2 to 4 demonstrate that it is possible, on the one hand, directly to produce, from thermally pretreated suspension polymers having a low bulk density and unsatisfactory flow properties, powders for ram extrusion which are superior with respect to their properties to products of the state of the art represented by products J and K. On the other hand, when products H to K are used as starting materials in the process of the invention, powders are obtained which are distinguished by an outstandingly high bulk density of over 800 g/l and a good flow index (Examples).

The improvement of the properties according to the invention of thermally pretreated polytetrafluoroethylene powders achieved by collision of the individual particles under the accelerating influence of a gas jet is not limited to suspension polymers. The same effects can also be obtained, as shown in Example 9, with sintered powders obtained from emulsion polymers. Emulsion polymers of this type yield, however, ram extrudates having mechanical properties that are inferior to those made with suspension polymers.

Example 10 is intended to illustrate that the properties of filler-containing polytetrafluoroethylene powders can also be improved by the process of the invention.

1 minute with switched on engine and closed funnel outlet. Then the outlet of the funnel is opened and the time is measured the powder needs to flow out with vibration. The time can be measured manually with a stop watch or fully automatically with a light barrier. The reproducability of the measurements is about ±0.1 seconds.

Degree of sintering according to differential thermoanalysis (DTA) 50 mg of the respective polytetrafluoroethylene powder are heated in air at a rate of 5° C. per minute. A thermogram is obtained showing the characteristic peaks at about 327° C. (for a 100% sintered product) and at about 340° C. (for a non sintered product). The degree of sintering according to DTA is calculated from the maximum height of the melt peaks at 327° C. ($d_1$) and 340° C. ($d_2$) according to the following equation:

$$\text{degree of sintereing} = \frac{2 \cdot d_1}{2 \ d_1 + d_2} \cdot 100$$

Hence, if $d_2$ is equal to zero, the sintering degree is 100%.

The following examples illustrate the invention.

(A) PREPARATION OF THE STARTING PRODUCTS

Polymerization was carried out in an autoclave having a capacity of 180 liters and equipped with stirrer and baffle plates. The autoclave had an enamelled inner surface.

The autoclave was first charged with 90 l of desalted

Table 1

|  | Comparative Example* | | | comparative Example D | Example 1 (according to invention) |
| --- | --- | --- | --- | --- | --- |
|  | A | B | C | | |
| apparatus used | mixer (discontinuous) | mixer (discontinuous) | mixer (discontinuous) | hammer mill** (continuous) | spiral jet mill (continuous) |
| temperature of product | <19° C. | <19° C. | <19° C. | <19° C. | 22°–23° C. |
| time of treatment of product (min) | 3 | 5 | 10 | <0.5 | <0.5 |
| bulk weight (g/l) | 655 | 665 | 710 | 540 | 775 |
| average particle size $d_{50}$ (μm) | 500 | 430 | 390 | 540 | 490 |
| flow index (sec/50 g) | 3.1 | 2.9 | 2.8 | 3.8 | 2.6 |

*analogous to U.S. Pats. Nos. 3,152,201
**when the treatment was repeated in the hammer mill under the same conditions the bulk weight and flow index of the product obtained did not change.

The properties of the products were tested according to the following methods:

Bulk density: according to DIN 53 468;

Dry Sieve Analysis according to DIN 53 477 with a sieve device type Jel 200-65 of Messrs. Engelsmann, Ludwigshafen) at an average vibration time of 15 minutes Mean Particle Diameter ($d_{50}$): the indicated value is defined as the calculated width of sieve meshes at which 50% of the powder remain on the sieve.

Flow index: 50 g of the powder to be tested are introduced into a funnel made from polyethylene (height 75 mm, upper diameter 400 mm, diameter of the outlet 12 mm). The funnel is firmly connected with a vibrator (Vibro-Mixer, E 1 of Messrs. Chemie-Apparatebau, Zürich). The distance from the engine case to the center of the funnel is 125 mm. The breadth of vibration of the vibrator, measured in the center of the funnel, is adjusted to 2 mm. The powder is subjected to vibration for water and the additives specified in Table 2. The stirrer was adjusted to a speed of 100 revolutions per minute. The autoclave was then scavenged repeatedly with nitrogen and twice with tetrafluoroethylene (3 bars) whereupon tetrafluoroethylene was forced in until the desired polymerization pressure was reached. After having adjusted the stirrer to a higher speed of 180 revolutions per minute, the additional polymerization auxiliaries indicated in table 2 and the modifying monomer, if any, were metered in. When the reaction had started, the polymerization pressure was kept constant by means of a regulating valve. The heat set free was dissipated by cooling the autoclave. Polymerization was continued to a solids content of 20% by weight, calculated on the liquid medium.

When the polymerization was terminated, the pressure of the tetrafluoroethylene was released and the autoclave was scavenged three times with nitrogen while stirring. In the case of the suspension polymers (comparative Examples, starting products A to J, and Examples 1 to 6), the liquid medium was discharged and the remaining product was washed three times, each time for 5 minutes with 100 l of water at a stirring speed of 110 revolutions per minute. In the comparative examples or with starting products A to H and in Examples 1 to 5 the crude and washed polymers were spread on sheet metal to form a 3 cm thick layer and directly dried for 4 to 5 hours at 200° C.

In the case of starting product I used in Example 6 the crude product was ground in a 100 l glass vessel in the presence of water by means of a grinding apparatus to an average particle size of 300 to 400 μm. The polytetrafluoroethylene particles were then mixed with gasoline (boiling range 80° to 100° C.) and the mixture was stirred for 2 hours whereby the particles agglomerated to larger particles having an average diameter of 400 to 500 μm. The agglomerates free from the liquid phase on a sieve were then spread on sheet metal in a layer thickness of 3 cm and dried under nitrogen for 5 hours at 280° C. The emulsion polymer (starting product L, Example 9) which, after polymerization, was obtained in the form of a dispersion having a solids content of 20% by weight, was diluted with water to a solids content of 10% by weight. The solid was coagulated in a container with rapidly rotating stirrer, washed three times, each time with about 150 l of desalted water, the water was separated on a sieve and the solid was dried for 20 hours at 110° C. on a sieve.

Starting product M used in Example 10 was commercial polytetrafluoroethylene powder containing 25% by weight of glass fibers as filler, which had been obtained by agglomeration of finely ground, granular polytetrafluoroethylene powder and glass fibers in a liquid medium.

TABLE 2
Data for the production of the starting polymers

| | charged to autoclave with liquid medium | | | metered in after polym. pressure had been reached | polymerization temp. °C | pressure bars |
|---|---|---|---|---|---|---|
| comp. Ex. A, B, C, D | 11.1 | g | (NH$_4$)$_2$CO$_3$ | 0.51 g PPVE 1.2 g APS | 15 | 5.5 |
| starting product E Ex. 1, 2 | 0.37 0.25 | g g | POS CuSO$_4$ . 5H$_2$O | 12.9 ml 18% ammonia 171 mg ADA dissolved in 2.1 ml 10% NaOH | | |
| starting product F Ex. 3 | 90 0.36 0.25 | g g g | (NH$_4$)$_2$CO$_3$ POS CuSO$_4$ . 5H$_2$O | 2.74 g APS 514 mg ADA dissolved in 7.5 ml 10% NaOH | 15 | 5.5 |
| starting products G and J Ex. 4 and 6 | 1.1 | g | ammonium oxalate | 0.2 g potassium manganate | 15 | 7 |
| starting product H Ex. 5 | 63 | g | (NH$_4$)$_2$CO$_3$ | 4.7 g PPVE 4.5 g APS | 69 | 10 |
| starting product L Ex. 9 | 18.9 | kg | 10% polytetrafluoroethylene seed disp. 79 g POS 108 ml 18% ammonia | 22.5 g PDVE 3.9 g sodium pyrosulfite 6.3 g APS | 28 | 15 |

TABLE 2-continued
Data for the production of the starting polymers

| charged to autoclave with liquid medium | metered in after polym. pressure had been reached | polymerization temp. °C | pressure bars |
|---|---|---|---|
| 84 mg CuSO$_4$ . 5H$_2$O 1.8 g diethylene glycol | | | |

POS = Perfluorooctanoic acid
APS = ammonium peroxodisulfate
ADA = azodicarboxylic acid diamide
PPVE = perfluro(propylvinyl ether)
PDVE = perfluoro-(1,4-dioxanyl-2,5-trifluoromethyl-3-vinyl ether)
(PPVE and PDVE as modifying monomers)

(B) THERMAL TREATMENT OF STARTING PRODUCTS

The polytetrafluoroethylene powders produced as described sub (a) were spread in a bulk height of 3.5 cm on sheet metal and heated to 380° C. in a tray cabinet where they were kept at said temperature for 4 hours. The heating time was about 2 hours, the cooling time to room temperature about 4 hours.

According to differential thermoanalysis the powders treated in this manner had a degree of sintering of 100%.

(C) FURTHER TREATMENT OF THE SINTERED PRODUCTS

Comparative Examples A to C

The sintered powder which had coalesced to a cake was cooled in a polyethylene container from the outside with dry ice to a product temperature below 10° C. and the cooled product was rapidly transferred into a mixer of Messrs. Rheinstahl Henschel, type RM 10 L which was maintained at about 15° C. by cooling water. The sinter cake was comminuted for different periods of time at a speed of 3,800 rotations per minute. After comminution, the product temperature was measured. In all three experiments it was below 19° C.

The properties of the powders obtained are indicated in Table 1.

Comparative Example D

The sintered polytetrafluoroethylene powder forming a cake as described in Comparative Examples A to C was cooled to a temperature below 10° C. and the cake was comminuted in a hammer mill of Messrs. Alpine Augsburg, type 40/32/HA at a speed of 2,300 rotations per minute. The mill was provided with a sieve plate the perforations of which had a diameter of 2 mm. During this grinding experiment, the room temperature was kept at 17° C. The resulting powder, which left the mill at a temperature of 18° C., had the properties indicated in Table 1.

STARTING PRODUCTS E, F, G, H, I, L AND M

The products produced as described sub (a) and sintered according to paragraph (b) were comminuted at room temperature (21° to 23° C.), without previous cooling, in a hammer mill of Messrs. Alpine Augsburg, type 40/32/HA at a speed of 2,300 rotations per minute. The sieve plate fitted in the mill had perforations with diameters of 2 mm each.

Starting products J and K were commercial, thermally pretreated polytetrafluoroethylene powders produced by suspension polymerization.

The properties of starting powders E to M are listed in Table 4.

EXAMPLE 1

A suspension polymer of tetrafluoroethylene, produced in the presence of 0.0011 mol % of perfluoropropylvinyl ether, calculated on tetrafluoroethylene, according to paragraph (a) was subjected to a thermal treatment according to paragraph (b). The weakly coalescent polytetrafluoroethylene particles obtained after sintering were disintegrated into the individual particles by mechanical means either discontinuously by a short term treatment in a mixer of Messrs. Rheinstahl Henschel for a period of 15 seconds or continuously in a hammer mill of Messrs. Alpine.

The thermally pretreated polytetrafluoroethylene powder obtained was then subjected to the aftertreatment according to the invention in a spiral jet mill of Messrs. Alpine, Augsburg, type 315 AS. The treatment was carried out with air in an amount of 430 Nm$^3$/hr under a pre-pressure of the air of 7.5 bars. The throughput of polytetrafluoroethylene powder was 30 kg/hr at a product temperature of 23° C. The powder leaving the mill was separated over a cyclone. The properties of the powder are indicated in Table 1.

By ram extrusion a bar (diameter 22 mm) and a pipe (internal diameter 32 mm, external diameter 39 mm) were produced from the polytetrafluoroethylene powder produced according to Example 1. The mechanical properties of the shaped structures are indicated in Table 3.

TABLE 3-continued

Mechanical properties of ram extrudates from polytetrafluoroethylene powders produced according to Example 1.

| properties | bar (diameter 22 mm) | pipe (internal diameter 32 mm external diameter 39 mm) |
|---|---|---|
| crosswise | — | 330 |
| density g/cc | 2.153 | 2.153 |
| Extrusion conditions: | | |
| length of sinter zone (mm) | 1100 | 800 |
| temperature in extrusion direction (°C.) | 370–380–370 | 380–390–390 |
| output m/h | 2 | 3 |

The powder produced according to Example 1, which had much better dosing properties than conventional powders, yielded ram extrudates of absolutely smooth surface. Neither on the bar nor on the pipe so-called "poker chip formation" could be observed visually. A thin disk cut transversely from the bar showed that the individual polytetrafluoroethylene particles had melted together without contours to a homogeneous, slightly transparent mass.

EXAMPLES 2 TO 10

Thermally pretreated starting products E to M were subjected to the aftertreatment according to the invention in the jet mill of Messrs. Alpine under the conditions specified in Example 1.

The properties of the starting products E to M and of the respective aftertreated products are indicated in Table 4.

TABLE 4:

| Type of powder | bulk density (g/l) | powder flow index (sec/50 g) | average particle diameter (d$_{50}$) (μm) | proportion <150 μm according to sieve analysis (%) |
|---|---|---|---|---|
| Starting product E | 570 | 3.6 | 610 | 0.2 |
| Example 2 | 770 | 2.5 | 440 | 3.8 |
| Starting product F | 475 | 4.7 | 825 | — |
| Example 3 | 740 | 2.8 | 540 | 1.2 |
| Starting product G | 515 | 5.8 | 600 | 0.1 |
| Example 4 | 760 | 3.0 | 420 | 3.8 |
| Starting product H | 760 | 2.4 | 400 | 2.6 |
| Example 5 | 1050 | 1.8 | 380 | 3.0 |
| Starting product I | 720 | 3.8 | 420 | 3.0 |
| Example 6 | 955 | 2.2 | 340 | 5.6 |
| Starting product J | 703 | 4.0 | 417 | 2.3 |
| Example 7 | 940 | 2.2 | 340 | 5.6 |
| Starting product K | 710 | 3.4 | 460 | 7.4 |
| Example 8 | 870 | 3.0 | 360 | 12.2 |
| Starting product L | 740 | 3.1 | 640 | — |
| Example 9 | 980 | 2.0 | 420 | 0.3 |
| Starting product M | 1000 | 2.1 | 530 | 1.0 |
| Example 10 | 1160 | 1.4 | 460 | 1.8 |

Table 3.

TABLE 3

Mechanical properties of ram extrudates from polytetrafluoroethylene powders produced according to Example 1.

| properties | bar (diameter 22 mm) | pipe (internal diameter 32 mm external diameter 39 mm) |
|---|---|---|
| tensile strength (N/mm$^2$) | | |
| lengthwise | 24.1 | 22.8 |
| crosswise | — | 19.7 |
| elongation at break % | | |
| lengthwise | 450 | 380 |

What is claimed is:

1. A process for preparing improved powders of non-melt-processable tetrafluoroethylene polymers, which comprises exposing a presintered powder of said-non-melt-processable tetrafluoroethylene polymer which is presintered to a degree of sintering of substantially 100% as determined by differential thermoanalysis, to an impact stress effected substantially solely by interparticulate collisions caused by the action of high velocity gas jets in a jet mill thereby increasing the bulk density and reducing the powder flow index.

2. The process of claim 1, wherein said presintered powder is a homopolymer of tetrafluoroethylene obtained by suspension polymerization.

3. The process of claim 1, wherein said presintered powder is a tetrafluoroethylene polymer obtained by suspension polymerization of tetrafluoroethylene in the presence of from 0.0004 to 1.5 mol percent, calculated on tetrafluoroethylene, of a modifying perfluorinated monomer.

4. The process of claim 3, wherein said modifying perfluorinated monomer is a perfluoro(alkyl vinyl)ether of the formula

wherein $R_f$ is a perfluoroalkyl group having from 1 to 4 C atoms, a perfluorinated ether of the formula

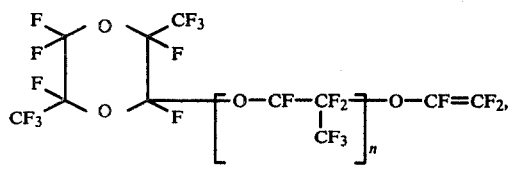

wherein n is 0 or 1, a perfluorinated ether of the formula

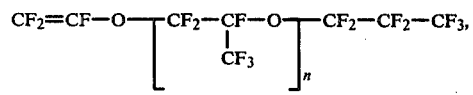

wherein n is 1 or 2, perfluoro-2-methylene-4-methyl-1,3-dioxolane, or a perfluorinated olefin of the formula

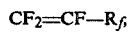

wherein $R_f$ is a perfluoroalkyl group having from 1 to 4 C atoms.

5. The process as claimed in claim 3, wherein said modifying monomer is $CF_2=CF-OC_3F_7$, $CF_2=CF-O-CF_2-CF(CF_3)-O-C_3F_7$, $CF_2=CF-CF_3$ or

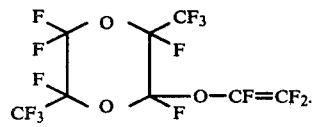

6. The process as claimed in claim 1 wherein said presintered powder contains an inorganic filler.

7. A presintered powder of non-melt-processable tetrafluoroethylene powder composed of, in polymerized form, tetrafluoroethylene and from 0.0002 to 0.5 mol percent, calculated on tetrafluoroethylene, of a perfluorinated modifying monomer, having a degree of sintering of substantially 100% as determined by differential thermo-analysis, an average particle diameter $d_{50}$ of from 200 to 900 μum with no more than 15% by weight of particles with a diameter below 150 μum, a bulk density of more than 770 grams per liter and a powder flow index not higher than 3 seconds per 50 grams.

8. A presintered powder of non-melt-fabricable tetrafluoroethylene as claimed in claim 7, which is composed of, in polymerized form, tetrafluoroethylene and from 0.0002 to 0.5 mol percent, calculated on tetrafluoroethylene, of a member selected from the group consisting of a perfluro(alkyl vinyl)ether of the formula

wherein $R_f$ is a perfluoroalkyl group having from 1 to 4 C atoms, a perfluorinated ether of the formula

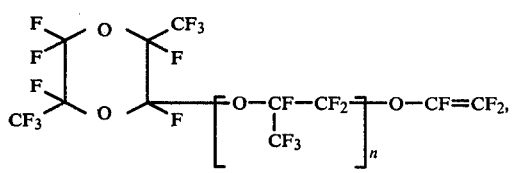

wherein n is 0 or 1, a perfluorinated ether of the formula

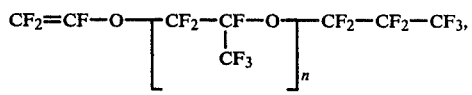

wherein n is 1 or 2, perfluoro-2-methylene-4-methyl-1,3-dioxolane, or a perfluorinated olefin of the formula

wherein $R_f$ is a perfluoroalkyl group having from 1 to 4 C atoms.

9. A presintered powder of non-melt-processable tetrafluoroethylene as claimed in claim 7, which is composed of, in polymerized form, tetrafluoroethylene and from 0.0002 to 0.5 mol percent, calculated on tetrafluoroethylene, of a member selected from the group consisting of $CF_2=CF-OC_3F_7$, $CF_2=CF-O-CF_2-CF(CF_3)-O-C_3F_7$, $CF_2=CF-CF_3$ or

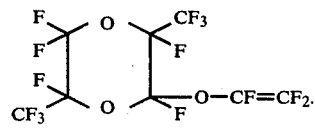

* * * * *